(12) United States Patent
Chen

(10) Patent No.: US 6,181,103 B1
(45) Date of Patent: Jan. 30, 2001

(54) ADVANCED INTELLIGENT COMPUTER POWER MANAGEMENT SYSTEM

(76) Inventor: Shu-Chin Chen, No. 7, Lane 307, Alley 150, Futan Road, Sec. 2, Pingchen City, Taoyuan Hsien (TW)

(*) Notice: Under 35 U.S.C. 154(b), the term of this patent shall be extended for 0 days.

(21) Appl. No.: 09/363,395

(22) Filed: Jul. 29, 1999

Related U.S. Application Data

(63) Continuation-in-part of application No. 08/863,618, filed on May 27, 1997.

(51) Int. Cl.[7] ........................................ H02J 7/00
(52) U.S. Cl. ...................... 320/106; 320/112; 702/63
(58) Field of Search .................... 320/112, 106, 320/113, 137; 702/63

(56) References Cited

U.S. PATENT DOCUMENTS

| | | | |
|---|---|---|---|
| 6,025,695 | * | 2/2000 | Friel et al. ............................. 320/106 |
| 6,078,871 | * | 6/2000 | Anderson ................................ 702/63 |
| 6,081,096 | * | 7/2000 | Barkat et al. ......................... 320/124 |

* cited by examiner

Primary Examiner—Peter S. Wong
Assistant Examiner—Gregory J Toatley, Jr.
(74) Attorney, Agent, or Firm—Rabin & Champagne, P.C.

(57) ABSTRACT

This invention is for the advanced intelligent computer power management (AICPM) system. The main features of this invention include converting the traditional smart battery pack into a removable and data accessible (RADA) battery pack and an intelligent power management algorithm embedded in the host computer. The improved RADA battery pack contains a temperature sensor, a display unit, and a memory (EEPROM). Peripherals mounted on the host computer side which contains a control unit, a charging circuit, a load circuit, a voltage divider, a current detector, a temperature control circuit, and a data bus are used to cope with the removal and data access operation for the AICPM system. The removable and data-accessible battery pack utilizes the functions provided by this invention to read, update, and record data about the battery pack, such as number of times used, remaining capacity, usable time, and nominal capacity. It also stores these data in the EEPROM of the RADA battery pack so that when the battery pack is used next time, the AICPM system can read out these data from the EEPROM and use them as the battery pack new information.

19 Claims, 6 Drawing Sheets

ADVANCED INTELLIGENT COMPUTER POWER MANAGEMENT SYSTEM

This Application is a continuation-in-part of patent application Ser. No. 08/863,618 Filed on May 27, 1997.

FIELD OF THE INVENTION

This invention relates to a simplified battery pack with an AICPM system to complete a smart battery management system. The simplified battery pack contains a temperature sensor, a display and an EEPROM. Such a simplified battery pack is referred to as a removable and data-accessible (RADA) battery pack. A RADA battery pack can be connected to an AICPM system via a data bus, and may record and display the characteristics, number of times used, remaining capacity, last time used, and all kinds of identification information pertaining to the battery pack. The main features of this invention include reducing the cost and adding new functions to the traditional smart battery.

DESCRIPTION OF THE PREVISOUS WORK

Most battery packs used in modern portable computers have installed a traditional gauge board for displaying and calculating battery capacities. Such batter packs are usually called smart battery packs. Smart battery packs provide the actual capacity, usable time, number of times used, and nominal capacity of the portable battery so that users can monitor the status of the battery and avoid unanticipated outages of power or interruptions of usage. However, the cost of this traditional gauge board is extremely high, takes up approximately one-fifths to one-thirds of the actual battery pack, and furthermore the battery pack itself is a disposable material. Thus, when the lifetime of the battery pack expires, the whole pack, including the expensive gauge board, must be disposed of, which causes unnecessary waste and increases manufacturing costs and increases the environmental burden. Moreover, the gauge board using many electronic components and occupying a significant portion of the battery pack increases the manufacturing difficulty and reduces the reliability of the product. When the traditional small battery pack is unused for an extended period of time, the energy stored in the battery dissipates due to the self-discharging of each battery cell (a natural electrochemical process). On the other hand, the traditional gauge board will itself continuously take up minute portions of electricity that often speeds up the dissipation of power, resulting in a significantly diminished energy capacity in the battery pack. In addition, the battery pack capacity in notebook computers is limited, and practically it is not wise, in terms of design, to continuously dissipate energy for the extraneous purpose of displaying battery information. For example, an ordinary gauge board will consume about 5–10 ma/HR a day, which is higher than the self-discharging of a single cell in the battery pack. That fact saliently points out the design drawbacks of traditional smart battery packs and leaves room for improvement.

SUMMARY OF THE INVENTION

The main purpose of this invention is to provide a reliable lifecycle record and analysis of the battery pack, and facilitate the best usage of the battery pack during its operation lifetime. Furthermore, the battery pack is implemented without a gauge board, thus reducing the manufacture cost of the battery pack and reduces the pollution burden the environment.

As mentioned above, this invention removes the original control circuit board of the smart battery pack to outside of the battery and enhances the algorithm for computing the battery characteristics to provide a more accurate estimate of the lifetime of the battery, thus greatly improving the performance of the battery. Meanwhile, the precise historical data of the battery can be preserved by an EEPROM installed inside the RADA battery pack and can be accessed anytime by the external control unit. When the RADA battery pack is connected on line with the AICPM system, the microprocessor unit (MPU) of the host computer (keyboard controller) will acquire the terminal voltage and the loop current of the battery pack detected by the voltage detector and by the current detector, respectively. It can also acquire the impedance variation caused by battery internal temperature change and detected by the temperature sensor. Such data may be treated as the basic parameters of the battery pack. The MPU uses the current direction detected by the current detector to decide whether the battery pack is currently in the charging or the discharging mode, and then computes and updates pertinent parameters of the battery. The internal memory of the removable data-accessible smart battery pack can be accessed via the 12C data bus to retrieve the parameters of the battery and use them determine the full function of the battery pack. The battery data can be obtained by the MPU through the SM bus in real time. The MPU updates the EEPROM of the RADA battery pack by storing the newest computed data in a timely manner, thus continuously updating the historic data of the battery. Meanwhile, the current status of the RADA battery pack is displayed on the notebook screen via the notebook keyboard control unit, i.e., it can provide the real-time data of the removable data-accessible smart battery pack to the notebook users at any time.

In the charging mode, the MPU controls the charging circuitry to output suitable voltage and current to continuously charge the RADA battery pack. Meanwhile, the terminal voltage, the charging current, and the internal temperature of the RADA battery pack are monitored. The internal program of the MPU then uses these data to determine whether the battery pack is fully charged. When the RADA pack is fully charged, the MPU controls the charging circuitry to stop the charging process and send out a fully charged notification to the user.

In the discharging mode, the MPU computes the remaining capacity and other pertinent parameters of the RADA battery pack by detecting the current flowing through the current sense resistor on a regular time basis. Meanwhile, the MPU determines whether the terminal voltage of the battery pack has reached the pre-specified lower limit by detecting the terminal voltage via a voltage detector. If the low voltage limit is reached, an alarm notifying user of the battery packs insufficient level will be sent to notify portable computer user(s) to turn-off the notebook and begin the battery pack charging process. During the charging/discharging processes, the MPU accepts and answers external inquiries coming from the SM bus so that the battery pack data can be accessed externally at any time and updates the battery internal memory regularly to preserve the newest status of the RADA battery pack. It also displays the battery status on a portable computer screen via the SM bus and the keyboard control of the portable computer, i.e., it can provide real-time information about the removable data-accessible smart battery pack to portable computer users.

BRIEF DESCRIPTION OF THE DRAWINGS

A detailed description of the structural design and operation principles for this invention is as follows.

Figures explanation.

DETAILED DESCRIPTION OF EACH BLOCK DIAGRAM

Figure 1:
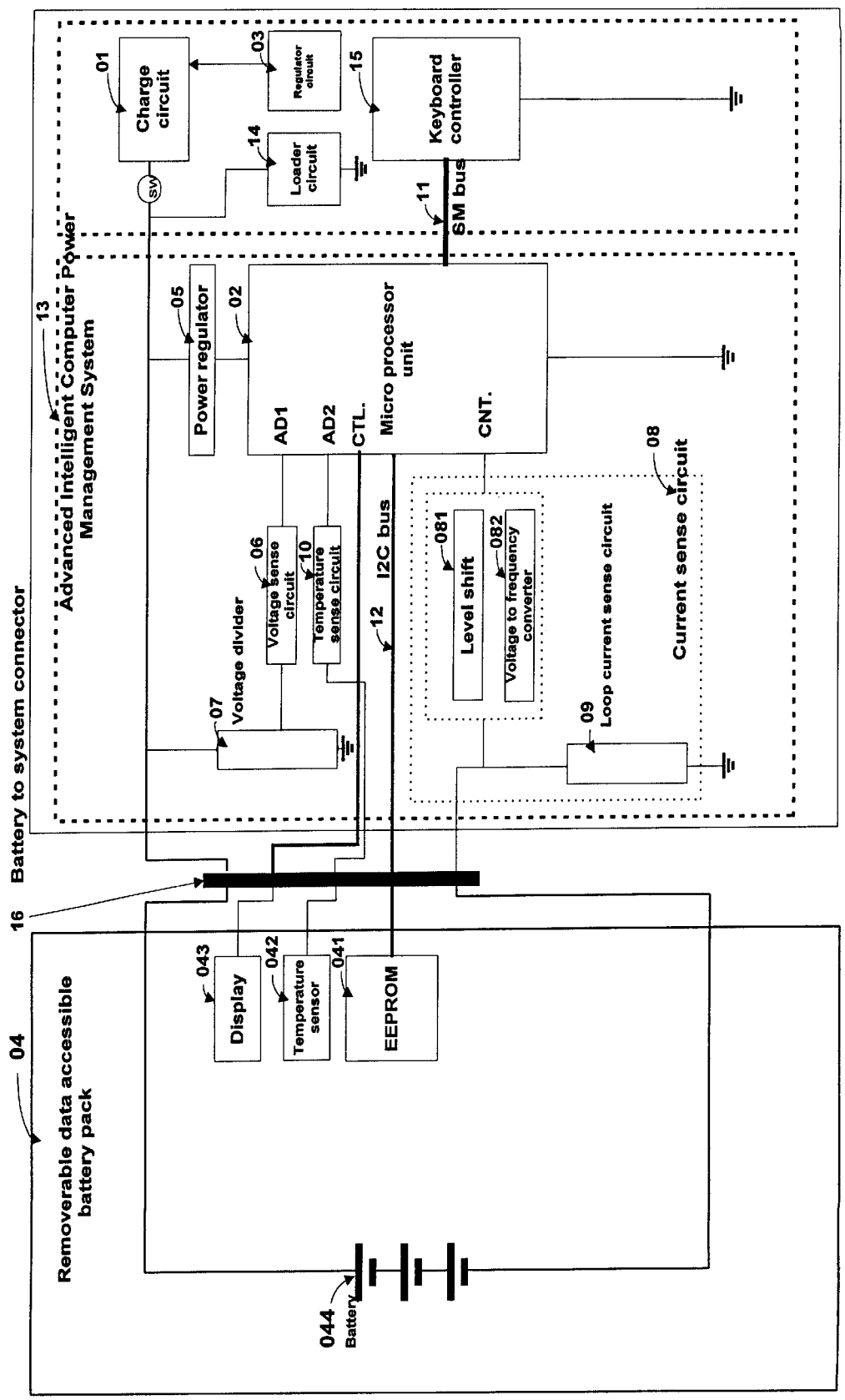
FIG. 1 shows the block diagram of the advanced intelligent computer power management (AIPCM) system.
Figure 2:
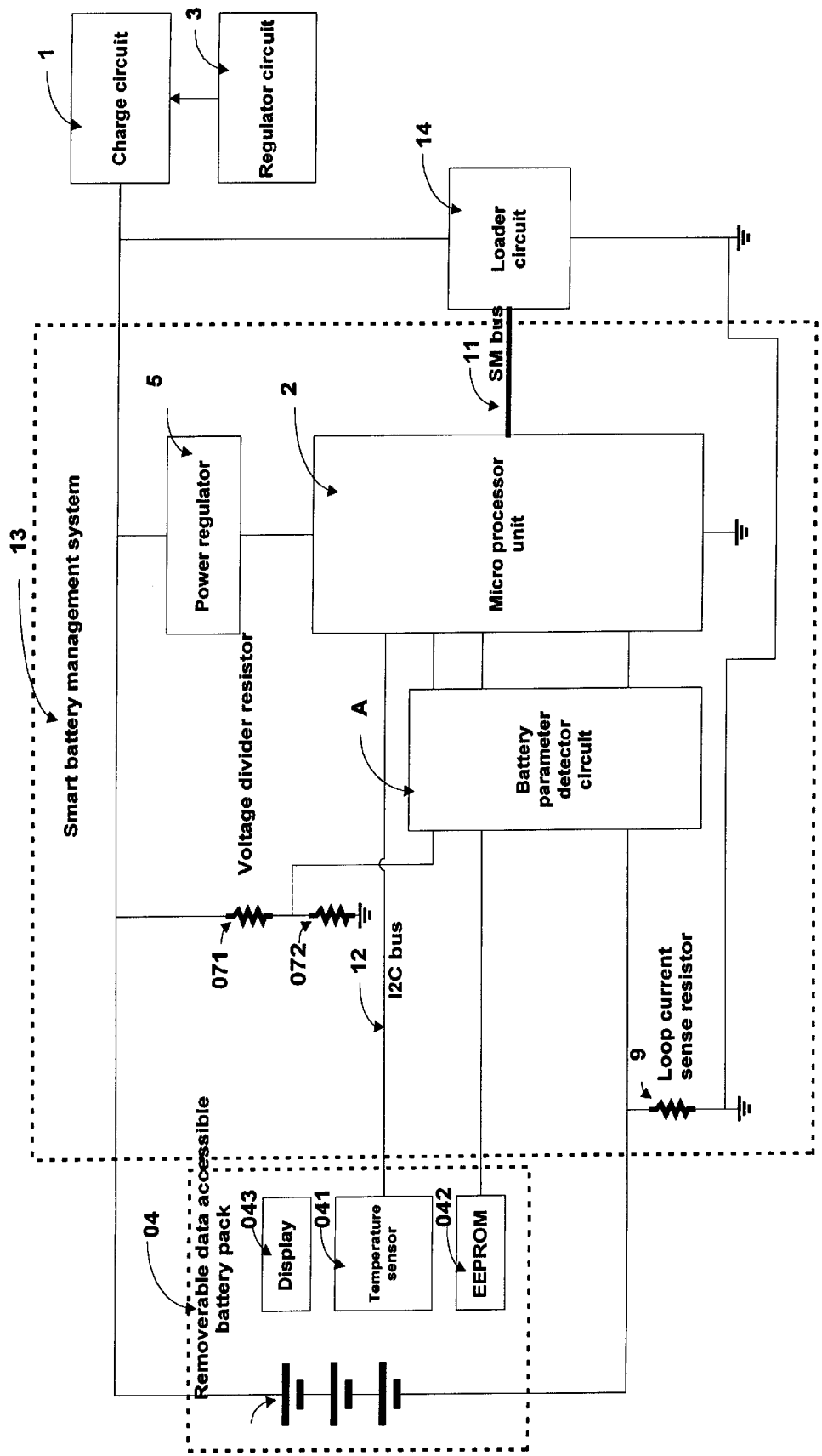
FIG. 2 is the block diagram of the original AIPCM in FIG. 1.

According to FIG. 1, the present invention includes:

Charging circuit (01): When the capacity of the RADA battery pack (04) falls below a pre-specified limit, the micro processor unit (MPU) (02) will instruct the charging circuit (01) to charge the removable data-accessible battery pack (04) according to a specified mode. The charging circuit (01) adjusts the charging voltage or current output according to the micro processor (02) instruction to optimally control the charging of the RADA battery pack (04). The discharging loader circuit (14) is for discharge. No matter what charging or discharging mode is being executed, the micro processor unit (02) will regularly update the battery data in the memory (EEPROM) (041) inside the RADA battery pack (04) according to the specified program.

Microprocessor unit (02) is the main control unit of this invention. The micro processor unit (02) uses the voltage sense circuit (06) to detect the terminal voltage of the RADA battery pack (04) and uses current sense circuit (08) to detect the current flowing through the RADA battery pack (04), and determines whether the RADA battery pack is in the charging or discharging mode. It also uses the temperature sense circuit (10) to detect the resistance variations of the temperature sensor (042) inside 041) the RADA battery pack (04). It then communicates with the EEPROM via 12C bus (12) to obtain pertinent internal data of the RADA battery pack (04) and uses such data for cross checking and for computing the overall information about the RADA battery pack (04). Afterward, the data in the EEPROM (041) is updated for later usage. The microprocessor unit (02) uses SM bus (11) to communicate with a control unit (15), namely, the keyboard controller of the portable or notebook computer. Through such communication, the microprocessor unit (02) can display the real time status of the RADA battery pack (04) on the portable computer screen via keyboard control to the users anytime.

Regulator circuit (03): The regulator circuit (03) converts AC power to a stable DC power for the charging circuit.

Removable and data accessible (RADA) battery pack (04): This RADA battery configuration is a prominent feature of this invention. The RADA battery configuration includes several battery cells (044), a memory (041), a temperature sensor (042), and a display (043). The battery cells (044) can be connected in series or parallel to form the desired battery pack to provide suitable power to the portable computer shown as the loader circuit (14). The memory (041) stores all pertinent data for the RADA battery pack (04) and responds to the inquiries from the external microprocessor unit at (02) any time. When not responding inquiries from the microprocessor unit (02), the RADA battery pack (04) does not dissipate any power thus avoiding any unnecessary power consumption. The temperature sensor (042) is a thermistor. It senses the surface temperature of RADA battery pack (04) and provides a linear resistance variation to the temperature sense circuit (10). The microprocessor then uses this resistance variation to determine the actual temperature. When the RADA battery pack (04) is disconnected from the AICPM system, i.e., when it is stored on the shelf and unused, the memory (041) and the temperature sensor (042) do not consume power thus saving battery energy. The display unit (043) is used to display the current capacity of the RADA battery pack (04).

Power regulator (05) provides a stable DC voltage to electronic components and semiconductor devices in the AICPM system (13).

Voltage sense circuit (06) detects the voltage drop across the voltage divider (07) and provides the result to the microprocessor unit (02) for determining current voltage of the RADA battery pack (04).

With regards to voltage divider (07), the terminal voltage of the RADA battery pack (04) is detected by using the voltage divider law $\{Vx[R1/(R1+R2)]\}$. This voltage is clamped between 0 to 5 V range for use by the voltage sense circuit (06).

Current sense circuit (08) uses Ohm law ($V=I \times R$) to detect minute current flowing through the loop current sensing resistor (09) and transform the detected voltage level to a proper value by the level shifter (081). It then converts this voltage into a frequency by using a voltage to frequency converter (082) and inputs this frequency into the internal counter of the microprocessor to count out the accurate frequency value. The dedicated software then converts this value into an actual current value for use to update the data of the RADA battery pack (04).

Loop current sense resistor (09) is a precision resistor with very small resistance. It is connected between the negative terminal of the RADA battery pack (04) ad the ground end of the loader circuit (14) for monitoring the charging and discharging current. The microprocessor unit (02) uses its current algorithm and the detected voltage drop across the loop current sense resistor (09) to compute accurate current value and determines whether the battery is in charging or discharging mode by the current direction across the loop current sensor resistor. It then updates the capacity data in EEPROM (041) of the RADA pack (04).

Temperature sense circuit (10) detects the small voltage variation of the temperature sensor (042) caused by the temperature change, which results in the resistance change of the negative temperature coefficient thermistor (042). It then amplifies this voltage to a suitable level to the A/D convert input of the microprocessor unit. The microprocessor unit (02) uses the digital signal to compute and monitor the temperature variation of the RADA battery pack (04).

Data bus (SM bus 11) is used to communicate between the AICPM system and keyboard controller (15) of the portable computer. Therefore the real time status of the RADA battery pack (04) can be displayed on the portable screen via keyboard control (15). That means the notebook computer users can get real time information about the removable data-accessible battery pack (04) at any time.

Data bus (12C bus 12) is used to connect the microprocessor unit (02) and the memory (041) of the RADA battery pack (04). The microprocessor unit (02) can access the internal data of the removable data-accessible battery pack (04) for backup and update via the 12C bus.

Advanced intelligent computer power management (AICPM) system (13) refers to the system management, detection and control portion of this invention. The AICPM system includes a voltage resistor (07), a current sense circuit (08), a temperature sense circuit (10), a microprocessor unit (02), a power regulator (05), a voltage sense circuit (06), a current sense resistor (09), and the control software for the AICPM system.

Figure 3:
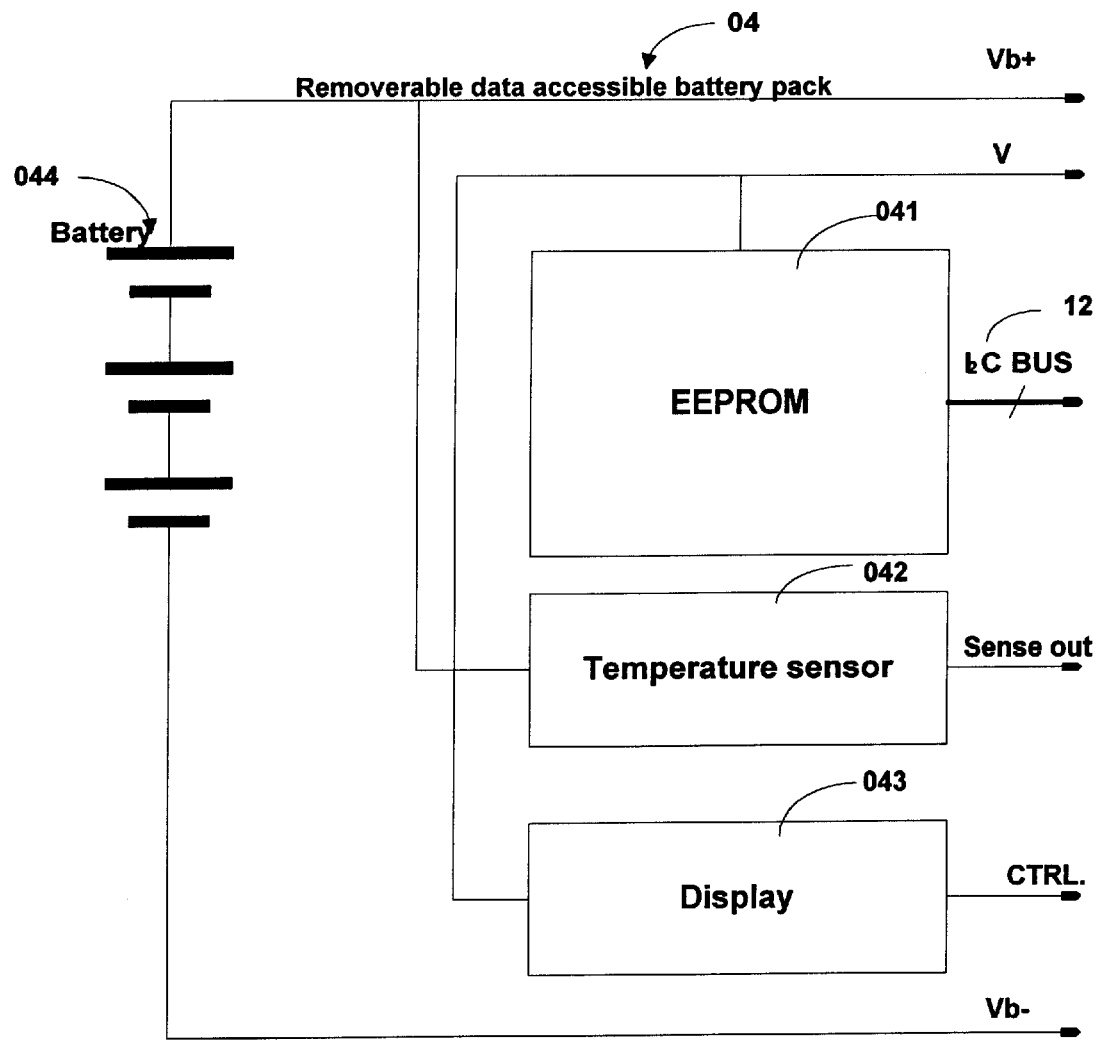
FIG. 3 is the block diagram of the internal memory (EEPROM), temperature sensor, and display of the removable and data-accessible smart (RADA) battery pack in FIG. 1.

Please refer to FIG. 3, the block diagram of the memory, temperature sensor, and display of the removable data-accessible battery pack (04).

Memory (041) is an EEPROM that provides external communication via data bus (12C bus 12). MPU (02) can also communicate with the portable computer via SM Bus. Another feature of the invention is that all parameters stored in the EEPROM can be read, replaced, and updated from a remote center through a network. This center can provide failure analysis, remote data control, and custom-designed task for the RADA battery pack.

Temperature sensor 042 is a thermister with negative temperature coefficient used to detect the voltage change due to temperature variation from the temperature detecting circuit. The MPU (02) monitors the voltage change and convert its value to the corresponding temperature.

Display Devices 043 include several LEDs on the battery pack used to show the battery capacity when requested.

The battery cell (044) includes several battery cells connected in series or parallel to form a convenient pack for use in the RADA battery pack (04).

OPERATIONAL PRINCIPLE OF THE AICPM SYSTEM

Figure 4:
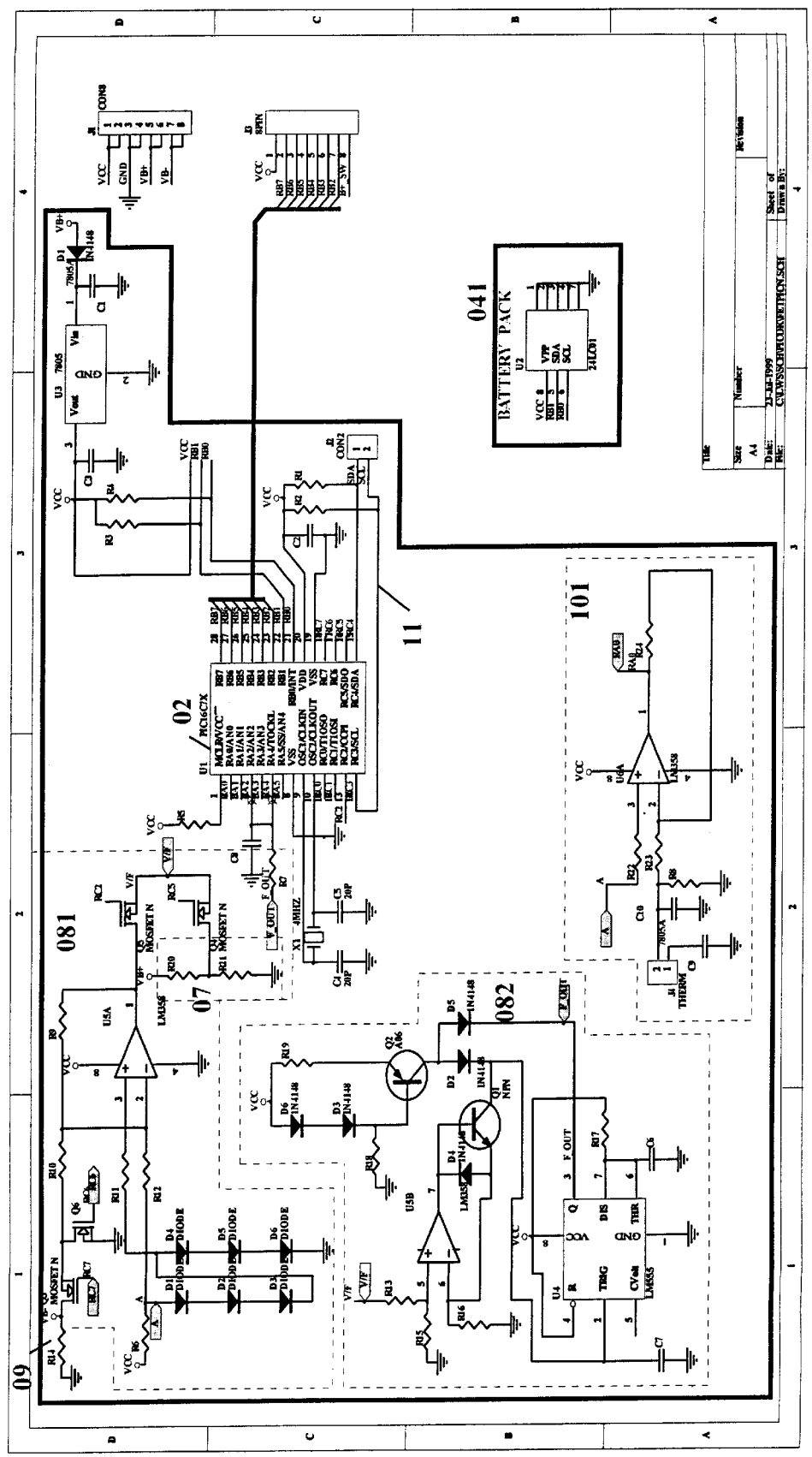
FIG. 4 is a detailed circuit diagram corresponding to FIG. 2.

The block diagram and circuit schematics are shown in FIG. 1 and FIG. 4, respectively. The operation principle of this invention works in the following manner: The discharging current of the RADA battery pack flows from the battery positive terminal, through external load (14), a small-value precision sense resister (091), and back to the battery negative terminal. The charging current loop of the RADA battery pack is the same as the discharging loop but in the opposite direction and the external load is replaced by a charger. The voltage across the sense resister represents the charging-discharging current of the RADA battery pack. The MPU (02) obtains the actual loop current by using a voltage to frequency converter (V/F), which converts the sense voltage to a certain frequency, corresponding to the detected current values. A resister divider network (071,072) is connected to the battery positive terminal and ground. The MPU (02) monitors the network voltage and converts to the actual battery voltage. A thermister is mounted in the battery pack (04). The resistance variation of the thermister, corresponding to the temperature change is converted to a voltage value. This voltage is detected and amplified. The MPU (02) then obtains the actual temperature of the RADA battery pack by reading this voltage. The charging/discharging mode of the RADA battery pack is determined by monitoring the current direction through the sense resister. In conjunction with the voltage, current and temperature information described above, and the battery parameters obtained from the EEPROM through 12C bus, the MPU (02) determines the functionality of the RADA battery pack by detailed calculation according to those parameters. Meanwhile, the MPU can also accept external requests (i.e. portable computer or notebook PC), respond to the requests with the battery status, and store new information in the EEPROM. In other words, by using the AICPM system, the portable computer or notebook PC can directly receive the battery information and display it on the screen continuously.

Figure 5:
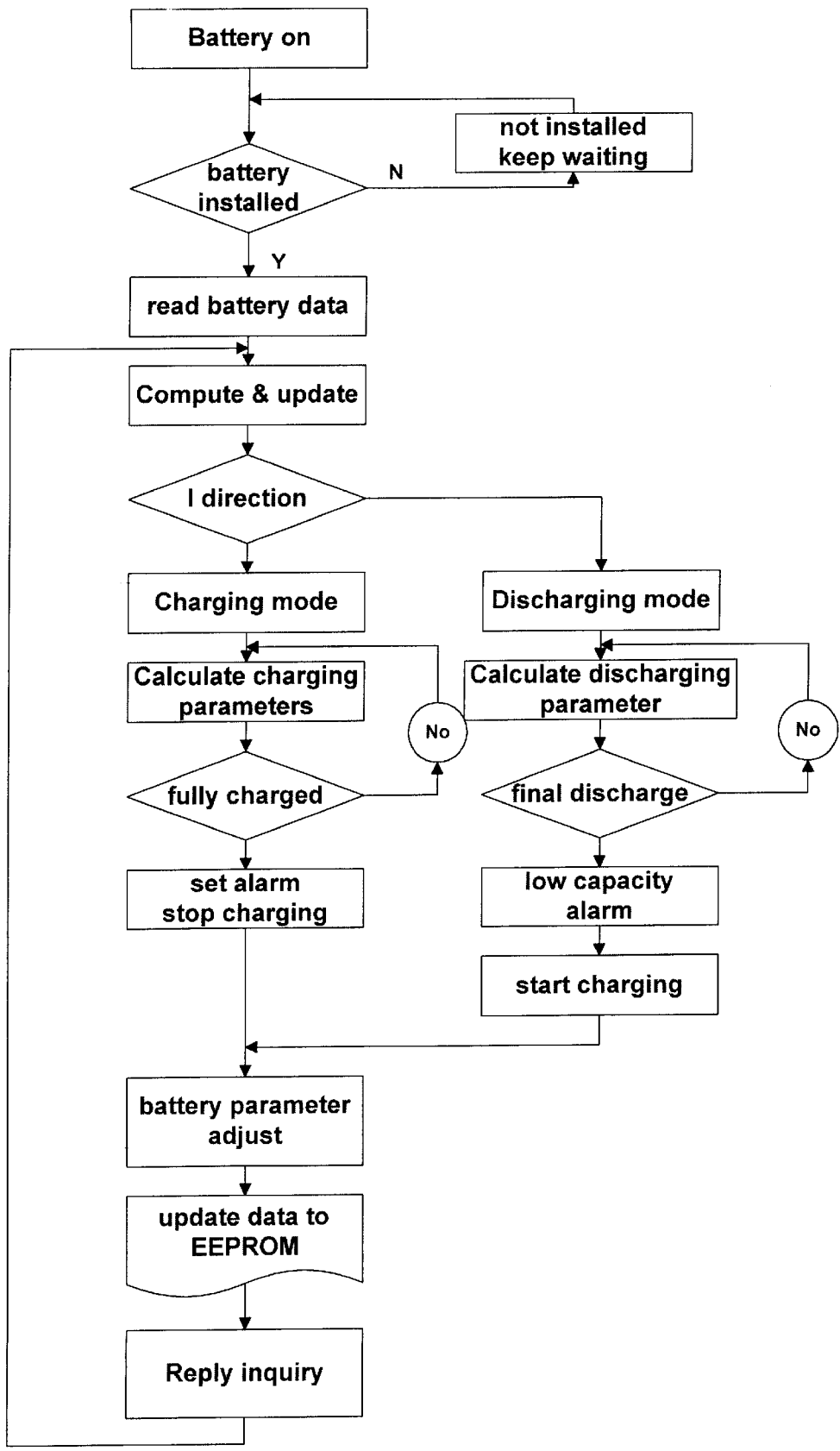
FIG. 5 is the flow chart for the battery algorithm of FIG. 2.

FIG. 5 illustrates a detailed logic flow diagram of the AICPM system. When the portable computer power (F00) is turned on, the MPU (02) examines whether the RADA battery pack has been inserted into the portable computer (F01). If the battery module is not plugged in, the MPU is placed in a waiting state until the battery pack is inserted into the portable computer. In the plug-in state, the MPU reads the battery pack parameters from the EEPROM (041), makes necessary calculations, refreshes new data for the EEPROM, and determines whether the battery module is in the charging or discharging state (F05).

In the charging mode (F06), the MPU calculates the charging parameters (F07) and monitors the MCV (maximum charging voltage, F08). If the battery charging voltage does not exceed the MCV, the battery is still in the charging mode until it reaches the MCV. After exceeding the MCV, the MPU generates an alarm warning and turns off the charger. In the discharging mode (F10), the MPU calculates parameters of the discharging mode (F11) and monitors the MDV (minimum discharging voltage). If the battery discharging voltage is above the MDV, the discharging process is continuous until the battery capacity is generated. Meanwhile the charger turns on (F14).

During the charging/discharging process, the MPU continuously stores the capacity, life cycle, and manufacturer data to the EEPROM. This will provide enough information to the portable computer through SM Bus whenever required.

Figure 6:
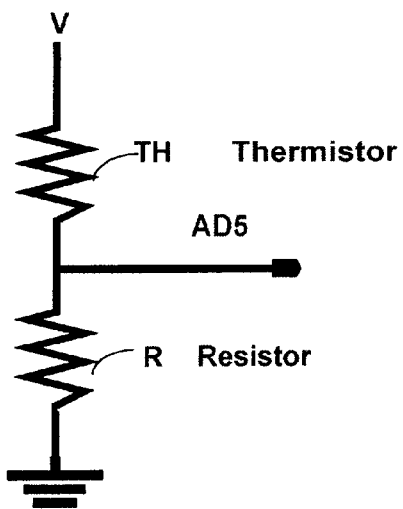
FIG. 6 is the circuit diagram of temperature sensor of FIG. 2.

FIG. 6 shows the schematics of the temperature detector circuit. This circuit consists of a negative coefficient thermister, mounted in the battery module, along with a linear compensated voltage divider resister R. A change in temperature causes a voltage variation across the resister R. The MPU monitors this voltage and converts it to the corresponding temperature.

Figure 7:
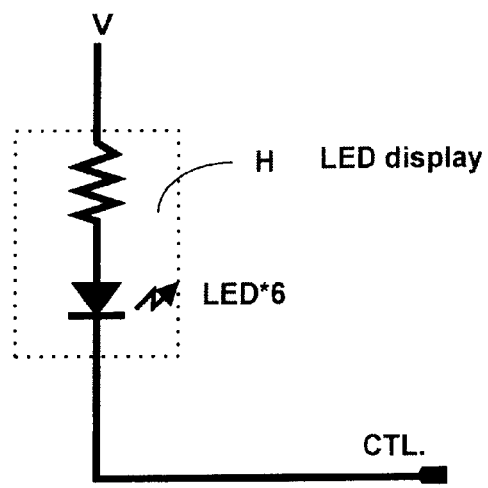
FIG. 7 is the circuit diagram of display of FIG. 2.

FIG. 7 shows the display circuit diagram. By using several LED's controlled by the MPU, the capacity of the battery module can be displayed whenever switch is pressed. Normally the switch is off for power conservation.

As described above, this invention presents a low cost battery management system, especially in the RADA battery pack. The preferred embodiments have been described and illustrated. It is submitted that all changes and modification that come within the spirit of the invention are protected.

What is claimed is:

1. An advanced intelligent computer power management (AICPM) system, comprising:
    a removable data accessible (RADA) battery pack, including:
        a battery pack having several rechargeable battery cells,
        a display that shows a power capacity status of said RADA battery pack,
        a memory, including an electrical erasable programmable read only memory (EEPROM), that stores data, and
        a temperature sensor having a thermister with a negative temperature coefficient; and
    an AICPM system that plans and manages said RADA battery pack, including:
        a microprocessor unit (MPU) having a single chip microcomputer that executes the software program used for battery management, voltage dividing resistors having serial precision resistors that sense the terminal voltage of the RADA battery pack, a current sensor having a precision resistor, a voltage level converter and a voltage frequency converter that sense the charging/discharging current of the battery pack, a voltage detector having a voltage regulating amplifier that detects the terminal voltage of said RADA battery pack, a temperature sensor having a linear amplifier that detects the surface temperature of said RADA battery pack, a voltage stabilizing rectifier having a voltage stabilizing transistor circuit that provides the hardware unit with a stable operating power source, a loop current sense resistor having a precision resistor with a small value that detects a direction and amplitude of charging/discharging current of said RADA battery pack, and a charging circuit that provides said RADA battery pack with a charging voltage source;

wherein said MPU directly outputs a signal to control the switch on or off of the charging or discharging current; and wherein said MPU automatically performs power management according to the signal variations obtained from the peripheral parts.

2. An AICPM system according to claim 1, wherein said memory in said RADA battery pack includes an EEPROM, wherein said EEPROM stores real time information including basic characteristic data of said RADA battery pack, remaining power capacity, amount of time used, the time of data storage recorded for the last one data, and wherein the real time information is provided to said MPU of said AICPM system as a reference to evaluate the performance of said RADA battery pack.

3. An AICPM system according to claim 1, wherein said temperature sensor of said RADA battery pack senses the temperature of said RADA battery pack, wherein an environment temperature is provided to said RADA battery pack under operation for the evaluation of a terminal voltage, said MPU of said AICPM System evaluates a variation of the end voltage of said RADA battery pack due to temperature, and the evaluated result is used as an investigation reference for dynamic adjustment of the end of discharge voltage, and wherein further information for the investigation of the saturation characteristic of said RADA battery pack in the charging state is determined.

4. An AICPM system according to claim 1, further comprising a data bus that enables communication between said RADA battery pack and said AICPM system.

5. An AICPM system according to claim 4, wherein said RADA battery pack and said AICPM system are connected to an exclusively external plug-draw connector.

6. An AICPM system according to claim 4, wherein said plug-draw connector includes a data bus, an EEPROM, a power supply input terminal, a temperature sensor, a display control and LEDs.

7. An AICPM system according to claim 1, further comprising a resistor that provides a serial connection between a charging/discharging load and said RADA battery pack to form a current loop, wherein a low level voltage drop is obtained by the rule of V=IR, wherein further the voltage level is transformed to a practical voltage level by a voltage level shifter, and is converted to a related frequency value by a voltage-frequency converter, and wherein further said counter of said MPU further converts the converted frequency value proportionally to an equivalent loop current value.

8. An AICPM system according to claim 7, wherein said voltage level shifter is used to linearly adjust the different polarity of charge/discharge voltage to a voltage value of 0~V/2 (discharge) and V/2~V (charge), which are voltage values matched to a linear operation region of a single power supplied operational amplifier, using the stable voltage drop of the diode, wherein the stable reference bias is obtained for the converting circuit.

9. An AICPM system according to claim 7, wherein said voltage to frequency converter also includes a stable current source that linearly converts the small output voltage variation of voltage level shifter to the frequency variation at n/n Hz per n mV.

10. An AICPM system according to claim 1, wherein said voltage detector is utilized by a rule of voltage dividing which is $\{V=R_1/((R_1+R_2))V_b\}$, wherein the output voltage varies between 0–5 V, the voltage is converted to a proportional digital signal by an A/D converter in said MPU, the digital signal is provided to the voltage algorithm in said MPU for recording and evaluating the variation of terminal voltage of the RADA battery pack, and said MPU examines the charging/discharging performance of said RADA battery pack.

11. An AICPM system according to claim 1, wherein said temperature sensor uses said thermal sensitive resistor in said RADA battery back to sense a variation of temperature, wherein the characteristic of the voltage variation (V=IR) produced by the temperature variation is obtained and amplified by an amplifier, the amplified voltage is proportionally converted to a digital signal by an A/D converter in said MPU, the digital signal is provided to the temperature algorithm in said MPU for recording and evaluating the temperature variation of said RADA battery, and said MPU can examine the performance of said RADA battery pack during charging/discharging process.

12. An AICPM system according to claim 11, wherein the nonlinear characteristic of the thermal sensitive resistor ($R_h$) is converted to a linear characteristic resistor by said divider resistor ($R_1$) and a reasonable resistance adjustment, wherein said $R_1$ is connected with said $R_h$ serially to obtain the voltage dividing effect $\{V_T=[R_h/(R_1+R_h)]V_b\}$.

13. An AICPM system according to claim 1, wherein:

in a charging mode, said MPU controls the charging voltage and current for said battery pack and monitors a battery terminal voltage, calculates related parameters and stores the calculated parameters in said EEPROM, and if the capacity of said battery pack is not saturated, the charging parameters are calculated continually, and if the capacity of said battery pack saturated, a warning signal of saturation is indicated and said charger is turned off, and in a discharging mode, said MPU monitors said battery terminal voltage, charging network current, and temperature variation, calculates discharging parameters, stores the discharging parameters in said memory, and determines an END of discharge voltage (EDV) of said battery pack, and if the EDV does not reach a discharging cut off voltage the discharge parameters are calculated continually, and if the EDV does reach the lower limit of the discharging voltage a low capacity warning signal is indicated and the charging circuit is turned on.

14. An AICPM system according to claim 13, wherein said MPU controls said charging circuit in the charging mode, and wherein, in an operating mode:
  if a temperature of said battery is higher than 0 degrees (Fahrenheit (F.)) or lower than 65 degrees (F.), said battery pack is determined to be in the normal charging mode, and the charging behavior for said battery is either in a limited constant voltage/current source or a limited constant current/voltage source, according to a preset charging value,
  if the battery temperature increases more than n degrees (F.) per minute or the temperature is higher than 65 degrees (F.) or the current of the battery circuit decreases or the terminal voltage of the battery is in a mode of ΔV, then the battery is determined to be saturated, and
  if the battery temperature is lower than 0 degrees (F.), said MPU controls the charging circuit to charge said battery in a pulse charging mode until the temperature of batter is higher than 0 degrees (F.) at which the charging mode converts to the normal charging mode.

15. An AICPM system according to claim 13, wherein said MPU records a discharging current, the terminal voltage, and temperature of the battery during discharging mode, and wherein said MPU calculates an estimated time to reach a lowest power capacity as well as parameters related thereto, and wherein, when the power capacity reaches the preset value of end of discharge voltage (EDV), said MPU generates a request to the keyboard controller through the data bus to instruct the user to turn off the computer.

16. An AICPM system according to claim 1, wherein the built-in power management/control software in said MPU performs:

dynamically correcting the end of discharge voltage (EDV) by investigating the battery temperature, cycle count, and the battery saturation voltage;
  determining the practical mode of use for said battery based on the completely charging/discharging behavior of said battery or based on behavior of said battery in an estimated compensation mode in which said battery is not completely charged/discharged;
  calculating the status of a practical upper limit of full capacity of said batter by precisely estimating the parameter of cycle count and the dynamic terminal voltage correction value of said battery pack; and
  estimating the status of battery operation by precisely compensating the hardware and using a software correction technique.

17. An AICPM system according to claim 16, wherein said dynamically correcting the end of discharge voltage (EDV) includes:
  correcting the value of the EDV by relating a temperature variation and battery terminal voltage variation, and the estimated time to turn off the computer does not change; and
  investigating the life of said battery by precisely counting the cycle count of said battery and then correcting the value of the EDV based on aging characteristics of said battery, and the estimated time to the end of battery maintains a constant value and the estimated time to turn off the computer is obtained.

18. An AICPM system according to claim 16, wherein said determining the practical mode of use for said battery is performed in an accumulation estimation mode, wherein a cycle count of the charging/discharging is incremented to correct the accumulation error of cycle count caused by the incompletely charging/discharging process.

19. An AICPM system according to claim 1, wherein said MPU determines the behavior mode of the management/control software by investigating the connection status between said temperature sensor in the RADA Battery Pack, the temperature sensor in the AICPM System, and the contents of said EEPROM.

* * * * *